(12) United States Patent
Orona

(10) Patent No.: US 9,296,319 B2
(45) Date of Patent: Mar. 29, 2016

(54) ARM SUPPORT

(71) Applicant: Solomon J. Orona, San Juan Capistrano, CA (US)

(72) Inventor: Solomon J. Orona, San Juan Capistrano, CA (US)

(*) Notice: Subject to any disclaimer, the term of this patent is extended or adjusted under 35 U.S.C. 154(b) by 0 days.

(21) Appl. No.: 14/185,791

(22) Filed: Feb. 20, 2014

(65) Prior Publication Data

US 2015/0232001 A1 Aug. 20, 2015

(51) Int. Cl.
*B60N 2/46* (2006.01)

(52) U.S. Cl.
CPC ............ *B60N 2/4666* (2013.01); *B60N 2/4673* (2013.01)

(58) Field of Classification Search
USPC ............... 248/220.21, 222.52, 224.8, 225.11, 248/118; 296/152, 153; 297/463.1
See application file for complete search history.

(56) References Cited

U.S. PATENT DOCUMENTS

| | | | |
|---|---|---|---|
| 5,054,170 A * | 10/1991 | Otrusina | 24/580.11 |
| 5,593,120 A * | 1/1997 | Hamerski | 248/205.3 |
| 6,938,862 B2 | 9/2005 | Orona | |
| 7,077,457 B1 | 7/2006 | Polette | |
| 7,484,809 B2 | 2/2009 | Hughes | |
| D615,393 S | 5/2010 | Cunningham, Jr. et al. | |
| 8,141,934 B2 | 3/2012 | Benkler et al. | |
| 8,308,115 B2 * | 11/2012 | Goto | 248/205.1 |
| 2006/0038097 A1 * | 2/2006 | Diller | 248/218.4 |
| 2012/0286113 A1 * | 11/2012 | Chen et al. | 248/206.2 |
| 2012/0292467 A1 * | 11/2012 | Chen | 248/206.2 |

* cited by examiner

*Primary Examiner* — Steven Marsh

(74) *Attorney, Agent, or Firm* — Klein, O'Neill & Singh, LLP

(57) ABSTRACT

A portable arm support has a hanger mount that is configured to be attached to a structure, such as an automotive door panel. A support member attaches to the hanger mount in a manner so that the support member is rotatable over a range of rotation. The support member can have a convex, curved support surface upon which a user may rest their arm. The support member may rotatably self-adjust upon placement of the user's arm on the support surface. The support member can be connected to the hanger mount via a connector, which connector is attached to a lower part of the support member, but not an upper part of the support member, so as not to resist deflection of the upper part of the support member.

20 Claims, 6 Drawing Sheets

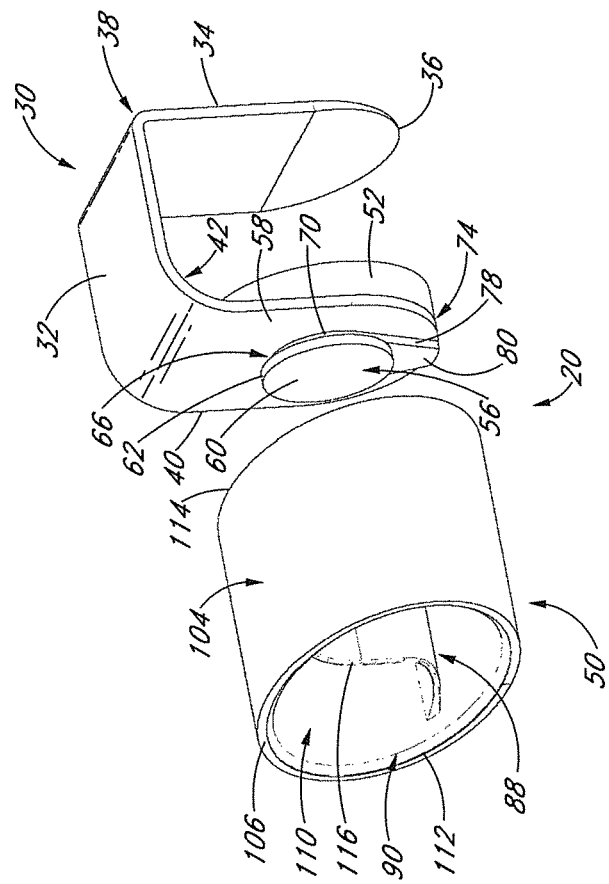
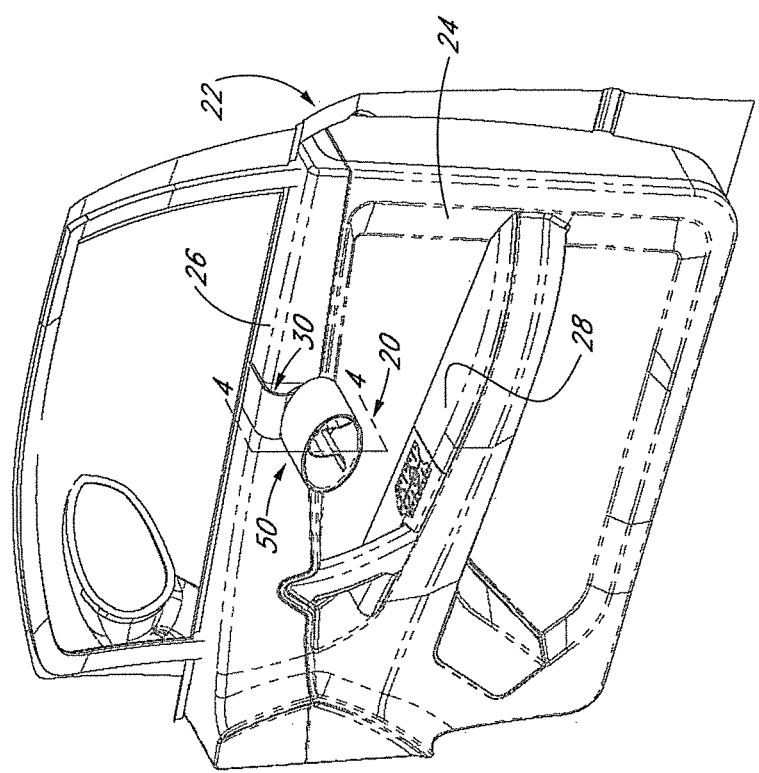

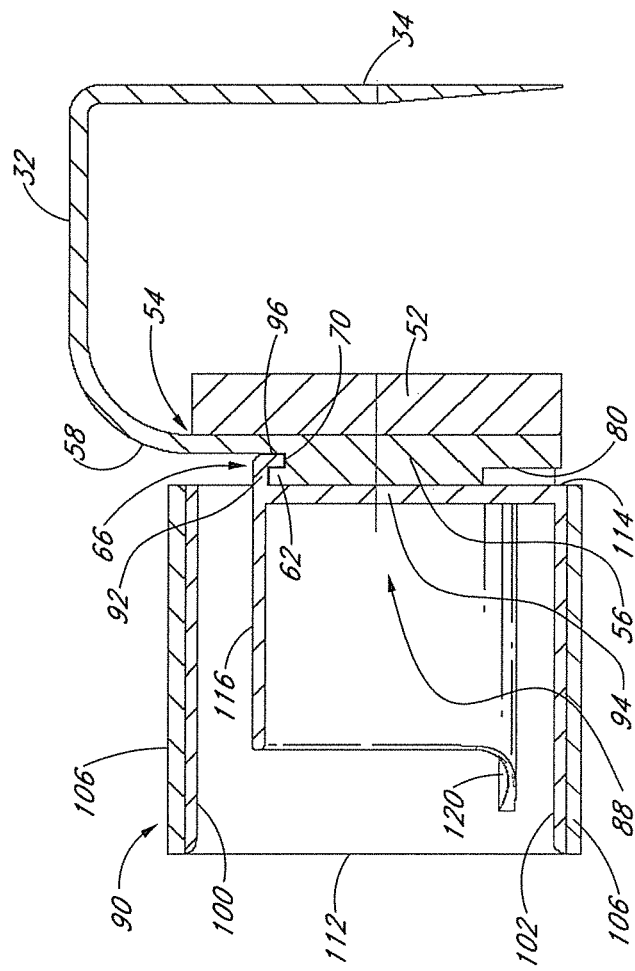
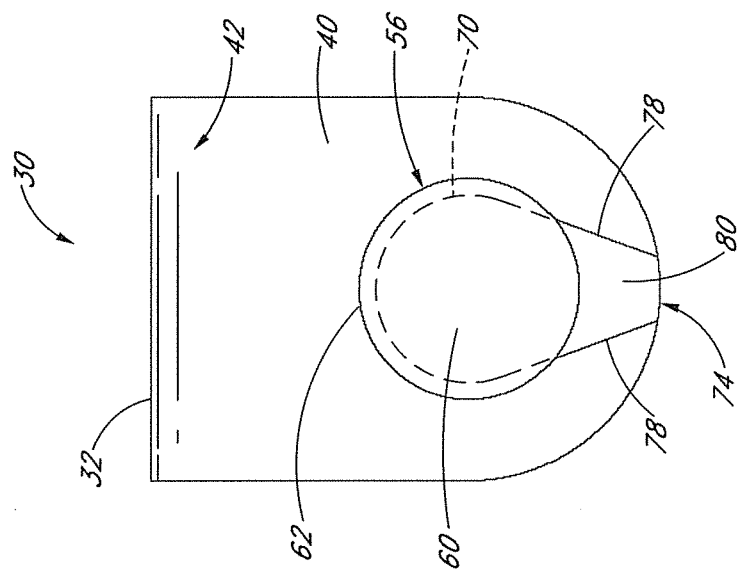

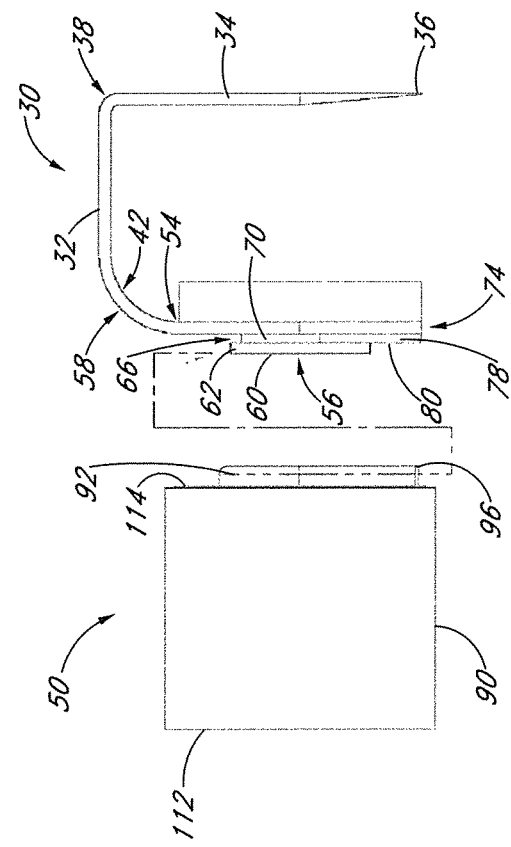
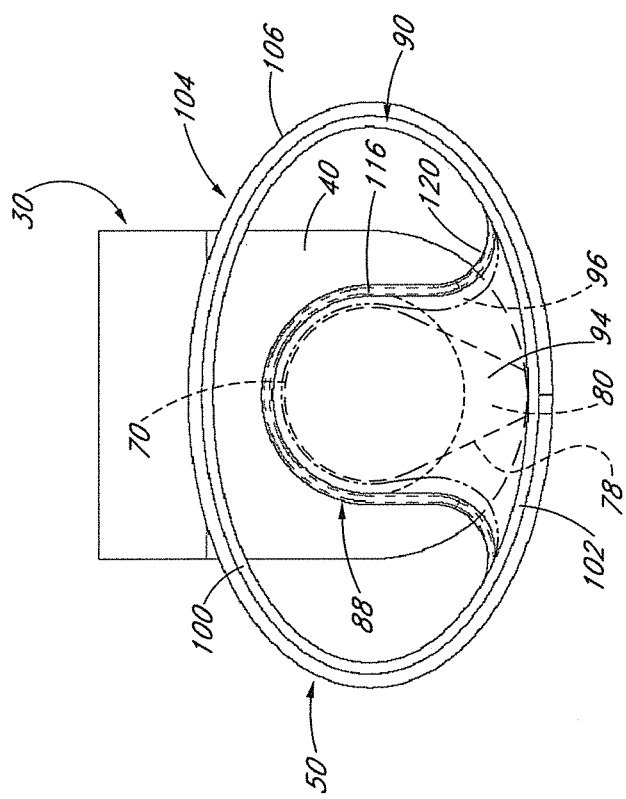

ARM SUPPORT

BACKGROUND

The present disclosure relates to portable arm supports.

Travelling can be uncomfortable. Seating in automobiles, airplanes and the like typically is designed to fit average body types, and thus doesn't properly fit many individuals. Further, such seating typically does not accommodate preferences of specific users. Arm rests are often provided; however, such arm rests typically are not adjustable. For example, automobiles typically have an arm rest integrated into a door panel. The integrated arm rest may be placed at a height that is suitable and comfortable for some people, but not for many others. Also, sometimes a passenger may wish to change their position, or lean their elbow on the arm rest. The integrated arm rest may not comfortably accommodate such passengers. As such, passengers often use other structures as arm rests. For example, in some instances a passenger may rest their elbow on an upper surface of an automobile door panel. This upper surface typically is not configured to accommodate an elbow, and the passenger's elbow may slip off the surface, which may not be at a preferred height anyway.

Portable arm supports are available that can be hung on portions of a vehicle, such as the automobile door panel. However, such arm supports also have limitations in convenience, adjustability and comfort.

SUMMARY

Accordingly, there is a need in the art for an arm support that offers improved versatility, adjustability, and/or comfort and support.

In accordance with one embodiment, a portable arm support is provided, comprising a mount and a support member. The mount is configured to be attachable to a structure, and has a raised mount portion extending from a support surface of the mount. The raised mount portion comprises an arcuate portion and a raised stop having first and second stop surfaces. The support member has an upper surface configured to accept a user's arm rested thereupon, and has a front side and a back side. A connector is provided on the back side. The connector is configured to engage the raised mount portion so that the support member is supported by the raised mount portion. The connector engages the raised mount portion so that the support member is rotatable relative to the raised mount portion between a first position in which the connector engages the first stop surface and a second position in which the connector engages the second stop surface.

In some such embodiments, the support member upper surface is curved so as to be upwardly convex, and in some embodiments the upper surface of the support member comprises a non-stick pad.

In further embodiments, the support member can comprise an upper part and a lower part, and the connector is attached to the lower part so that a vertical space is disposed between the upper part and the connector. In some embodiments the support member is configured to deflect upon application of a force to the upper part so that the space between the upper part and the connector decreases upon application of the force.

In additional embodiments the raised mount portion comprises a disk-shaped member having a circumferential edge, and a channel is formed between the circumferential edge and the support surface of the mount, wherein the connector comprises a lip that fits into the channel. In some embodiments a hollow space is defined between the first and second sides of the support member. Further embodiments may additionally comprise an insert sized and configured to releasably fit within the hollow space, the insert comprising a front wall configured to enclose the first side of the support member. In yet further embodiments the support member has a back wall at or adjacent the back side, and the connector extends from the back wall.

In still other embodiments the mount is configured to engage an inside door panel of an automobile so that the support surface of the mount is generally vertical and rests against the inside door panel.

In another embodiment, a portable arm support is provided comprising a mount having an upwardly-directed portion, and a support member having an upper part and a lower part. The upper part defines an upper surface configured to accept a user's arm rested thereupon. A connector is attached to the lower part of the support member but spaced from the upper part of the support member. A mount member is defined on the upwardly directed portion of the mount. The connector selectively engages the mount member of the upwardly directed portion of the mount so that the support member is suspended from and supported by the mount member.

In some embodiments, the upwardly-directed portion is vertical. Another embodiment comprises a spring structure between the upper and lower parts of the support member. In yet another embodiment, the upper part of the support member is arcuate, and the spring structure is at least partially incorporated into the upper part. In still another embodiment, the spring structure is at least partially incorporated into a transition between the upper and lower parts.

In further embodiments, the connector selectively engages the mount member so that the support member is rotatable relative to the mount. In another embodiment the upwardly-directed portion comprises a plurality of mount members that are vertically and/or horizontally spaced apart from one another.

In yet another embodiment the upper and lower parts of the support member define a space therewithin. In a yet further embodiment, the support member has a front side and a back side, and the connector selectively engages the mount member at or adjacent the back side. Still other embodiments may comprise a connector wall extending from the connector toward the front side of the support member, an elongate portion of the connector wall attached to the lower part of the support member between the second and first sides of the support member.

BRIEF DESCRIPTION OF THE DRAWINGS

FIG. 1 shows a perspective view of an embodiment of a portable arm support releasably attached to an interior of a car door;

FIG. 2 shows an exploded perspective view of the arm support of FIG. 1;

FIG. 3 shows an end view of a hanger mount of the arm support of FIG. 1

FIG. 4 is a cross-section of an arm support taken along lines 4-4 of FIG. 1

FIG. 5 is an end view of the arm support of FIG. 1

FIG. 6 is a side exploded view of the arm support of FIG. 1;

DESCRIPTION

Figure 8:
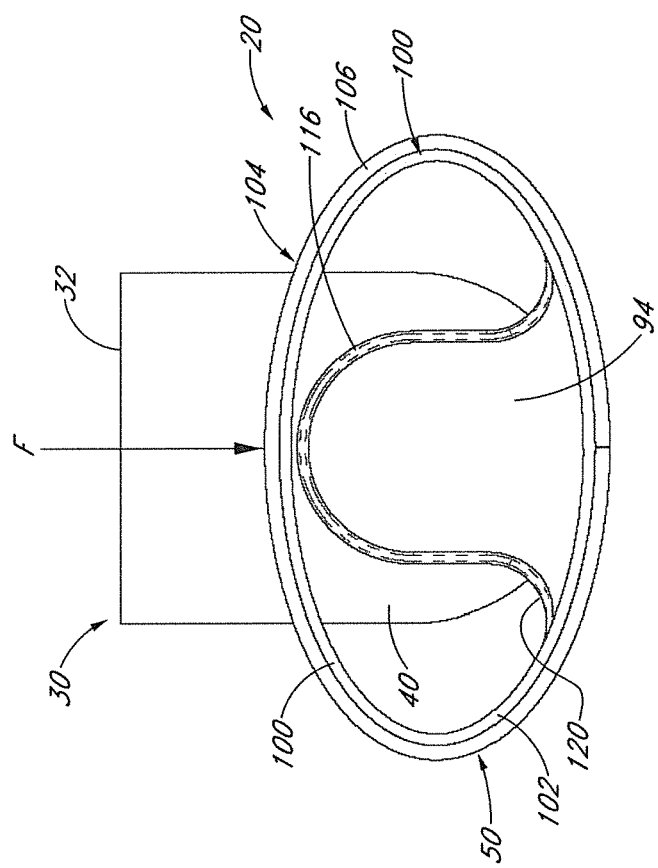
FIG. 8 shows the arm support of FIG. 1 partially deflected by a load.

With initial reference to FIG. 1, an embodiment of a portable arm support 20 is illustrated attached to an automotive door panel 24. The portable arm support 20 comprises a hanger mount 30 and a support member 50. The hanger mount 30 engages and hangs from the door panel 24, while the support member 50 is releasably attached to and supported by the hanger mount 30.

With additional reference to FIGS. 2-6, the illustrated hanger mount 30 comprises a bridge portion 32 from which a depending portion 34 depends. A support portion 40 also depends from the bridge portion 32 and is spaced from the depending portion 34. The depending portion comprises a tapered tip 36, and connects to the bridge portion 32 at a back transition 38 which, in the illustrated embodiment, is about 90°. A front transition 42 from the bridge portion 32 to the support portion 40 also preferably is about 90°. In the illustrated embodiment the front transition 42 is arcuate, curving along a radius of curvature that is greater than a radius of curvature of the back transition 38 from the bridge portion 32 to the depending portion 34. Of course, it is to be understood that, in other embodiments, the curvature of the transition portions can be configured differently as desired.

The depending portion 34 preferably is configured so as to be insertable between the window and door panel 24 of a car door 22 so that the bridge portion 32 rests atop a top surface 26 of the door panel 24. As such, the hanger mount 30 is hung upon the door panel 24. The support portion 40 depends from the bridge portion 32 and rests against the door panel 24. Preferably the support portion 40 extends substantially vertically. In the illustrated embodiment, the hanger mount 30 is spaced from and above an integrated arm rest 28 of the automotive door panel 24.

In the illustrated embodiment, a pad 52 is attached to an inner surface 54 of the support portion 40. The pad 52 is configured to rest against the door panel 24, protecting both the hanger mount 30 and the door panel 24, and ensuring a snug fit without any rattles. In some embodiments the pad 52 is quite large and compressible so as to enable a snug fit with door panels of various widths.

With continued reference particularly to FIGS. 2-6, a raised mount member 56 extends outwardly from the outer surface 58 of the support portion 40 substantially opposite the pad 52. The illustrated raised mount member 56 includes a disk-shaped holder 60 having a circumferential edge 62. Along at least an upper portion of the raised mount member 56, a channel 66 is formed between the circumferential edge 62 of the disk shaped holder 60 and the outer surface 58 of the support portion 40. The channel 66 includes a channel surface 70 that is spaced from the circumferential edge 62 surface of the holder 60. In the illustrated embodiment, the channel surface 70 generally follows the curvature of the circumferential edge 62 at least in the upper portion of the holder 60, such as along at least the upper 180° of the disk-shaped holder 60.

In the illustrated embodiment, the channel surface 70 generally follows the curvature of the circumferential edge 62 over more than the top 180° of the raised mount member 56. However, as best shown in FIGS. 2 and 3, in a lower portion of the raised mount member the channel surface 70 straightens out and extend toward and terminate at a tip 74 of the support portion 40. The portions of the channel surface 70 that diverge from following the curvature of the disk-shaped holder 60 comprise stop surfaces 78, and a raised stop 80 is defined between the opposing stop surfaces 78.

In the illustrated embodiment the raised stop 80 is raised from the outer surface 58 a distance generally corresponding to the width of the channel 66. It is to be understood that in other embodiments the raised stop can have other shapes and widths.

The opposing stop surfaces 78 are relatively straight and spaced apart from one another. In the illustrated embodiment, the opposing stop surfaces 78 extend toward the tip 74 of the support portion 40 in directions that are generally converging, but the stop surfaces 78 terminate at the tip 74 of the hanger mount support portion 40 before crossing one another. In some embodiments, the stop surfaces can extend in directions that are diverging or generally parallel. In still other embodiments, the stop surfaces can converge on the support portion, before either stop surface reaches the tip of the support portion.

The hanger mount 30 can be made from any rigid or semi-rigid material such as plastics or metal. In some embodiments, the hanger 30 can be formed as one piece via, for example, milling or injection molding. Also, in some embodiments all of part of the hanger mount can include multiple materials, such as the support portion having a strong metal core over which plastic may be injection-molded.

With continued reference to FIGS. 1-6, the illustrated support member 50 comprises an inner support portion 88 and an outer support portion 90. The inner support portion 88 preferably is configured to engage and be supported by the raised mount member 56. The outer support portion 90 is configured to support a user's arm.

With particular reference to FIGS. 2 and 4-6, preferably the inner support portion 88 includes a connector 92 that is configured to fit onto and over the raised mount member 56 of the hanger mount 30. More specifically, the inner support portion 88 includes a back wall 94, and the connector 92 extends outwardly from the top of the back wall 94. The connector 92 preferably includes a lip 96 extending generally inwardly, spaced from and parallel to the back wall 94. As shown particularly in FIG. 4, the lip 96 fits over the disk-shaped holder 60 circumferential edge 62 and into the channel 66. Preferably the connector 92 and lip 96 are complementary in size and shape to the disk-shaped holder 60 and channel 66, respectively. As such the lip 96 fits in the channel 66, and the inner support portion 88 hangs from the hanger mount 30 raised mount member 56.

Figure 7:
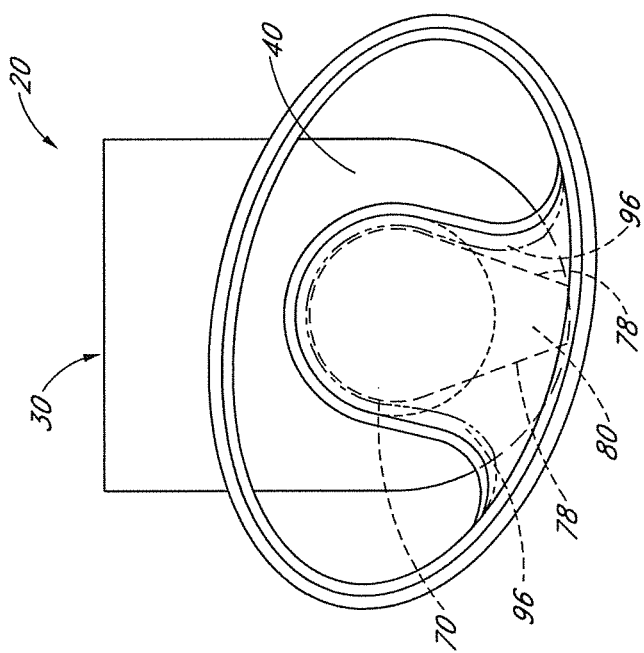
FIG. 7 shows the arm support of FIG. 1 in a rotated position.

In a preferred embodiment, the connector 92 and lip 96 are arcuately shaped to complement the arcuate shape of the raised mount member 56. With additional reference to FIG. 7, due to the complementary arcuate shapes, the inner support member 88 can be rotated relative to the hanger mount 30 over at least a range of rotation. Within such range of rotation the lip 96 remains engaged in the channel 66 so that the inner support portion 88 still hangs from the hanger mount 30. In the illustrated embodiment, the stop surfaces 78 define the range of rotation. More specifically, as the inner support member 88 is rotated in either direction, eventually the lip 96 will engage one of the stop surfaces 78, which diverge from the arcuate channel surface. When the lip 96 is engaged with a stop surface 78, as depicted in FIG. 7, the inner support member 88 is prevented from further rotation in that direction.

With reference again to FIGS. 2 and 4-6, the outer support portion 90 comprises an upper part 100 and a lower part 102 that are substantially contiguous and unitarily formed. In the illustrated embodiment, the upper part 100 comprises a curving upper support surface 104 that is generally convex. The lower part 102 also curves, and is generally concave. The upper and lower parts 100, 102 are contiguous, so that the outer support portion 90 is generally oval-shaped when viewed from an end as in FIG. 6. In other embodiments, the outer support portion can have various cross-sectional shapes, including smoothly curving shapes such as ovals, circles, and even bean-like shapes; and also shapes incorporating hard corners such as squares, rectangles, triangles or the like. Some embodiments may have cross-sectional shapes that have both smoothly curving portions and one or more hard corners.

In the illustrated embodiment the outer support portion 90 is formed of a rigid or semirigid material such as plastic. A non-slip pad layer 106 such as a foam and/or elastomer preferably is attached to at least the upper part of the outer support portion. The non-slip pad layer 106 provides a comfortable surface upon which a passenger may rest their arm. In the illustrated embodiment, the pad layer 106 is attached about the circumference of the entire outer support portion 90.

The illustrated configuration, in which the upper and lower parts 100, 102, are curvaceous creates a structural configuration in which the outer support portion 90 is quite flexible. In particular, the structure at and adjacent the transition from the upper part 100 to the lower part 102 can behave like a spring. As such, the illustrated configuration can be considered to have a spring structure between the upper and lower parts 100, 102, even though the upper and lower parts can participate substantially in the spring-like behavior. It is to be understood that other configurations can be shaped differently, but also be considered to have a spring structure between the upper and lower parts. In still other embodiments, an upper part defining an upper support surface can be connected to a lower part by a more traditional spring structure such as coil, torsion, leaf or cantilever springs.

The outer support portion 90 preferably defines a substantially hollow space 110 inside, extending from a front edge 112 to a back edge 114 of the outer support portion 90. In the illustrated embodiment, at least a portion of the inner support portion 88 is disposed within the hollow space 110. As best shown in FIG. 4, the back wall 94 of the inner support portion 88 is connected to the lower part 102 of the outer support portion 90 at or adjacent the back edge 114, and extends upwardly therefrom, with the connector extending backwardly from a top of the back wall 94. In this embodiment, the back wall 94 is not attached directly to the upper part 100, and is in fact vertically spaced from the upper part.

With continued reference to FIGS. 1-6, in the illustrated embodiment, a connector wall 116 extends from the back wall 94 and into the hollow space 110 within the outer support portion 90. An upper portion of the connector wall 116 preferably is arcuate and convex over about 180° so as to approximate and extend inwardly from the curving connector 92. In a lower portion, the connector wall 116 straightens out, and then curves outwardly in transition portions 120 that connect to the lower part 102 of the outer support portion 90. Preferably the transition portions 120 curve so as to make a smooth transition to the curving lower part 102. In the illustrated embodiment, the transition portions 120 of the connector wall 116 extend further toward the front edge 112 of the outer support portion 90 than do other parts of the connector wall 116. Effectively, the connector wall 116 connects the back wall 94 to the lower part 102. The illustrated connector wall distributes that connection across a majority of the width of the outer support portion 90.

With particular reference to FIGS. 2 and 4, in the illustrated embodiment the front edge 112 of the rigid or semi-rigid outer support portion 90 is beveled inwardly. Preferably, however, the pad layer 106 maintains its thickness at the front edge. In some embodiments a portion of the pad layer may extend around the front edge 112 and/or back edge 114 so as to further improve safety and comfort.

In a preferred embodiment, the support member 50 is unitarily formed, such as by injection-molding and/or milling of plastic. As such, the inner and outer portions 88, 90 are formed as a unitary piece, upon which the non-stick pad 106 can be deposited. In other embodiments, portions of the support member 50 may be formed independently and connected together via rigid or flexible connectors.

To use the device, a passenger first puts the hanger mount 30 in place—such as upon the door panel 24 of an automobile—and then hangs the support member 50 on the hanger mount 30. The user can affirmatively rotate the support member 50 relative to the hanger mount 30 in order to find a desirable, comfortable position. Also, the curving nature of the upper support surface 104 allows the user to choose a particular point along the support surface 104 that is most comfortable. Further, due to its rotatability, when a user applies a force F on the support member 50, such as by resting their arm or elbow on it, the support member 50 may rotate somewhat so as to equalize forces, and best accommodate that force. Such self-adjustment can maximize user comfort.

With reference next to FIGS. 6 and 8, the curving structural configuration of the oval outer support portion 90 and inner support portion 88 functions as a flexible spring for the support member. This can provide substantial improvements in user comfort. More specifically, as a user leans upon the support member 50, force F will be applied to the support member upper support surface 104, which will cause the upper or lower parts 100, 102 to deflect somewhat under the force F. Since the upper support surface 104 of the outer support portion 90 is spaced from the top of the outer wall 94, there is space available for such deflection. FIG. 8 depicts a situation in which the force F deflects the outer support portion 90 substantially, reducing the space between the upper support surface 104 and the back wall 94 relative to the at-rest position illustrated in FIG. 6.

When the arm support 20 is used in a moving vehicle such as, for example, an automobile, it is anticipated that there will be bumps and such incident to driving. The springiness of the illustrated support member 90 helps to absorb and dampen such bumps, resulting in a more flexible and comfortable support for the user.

Figure 9:
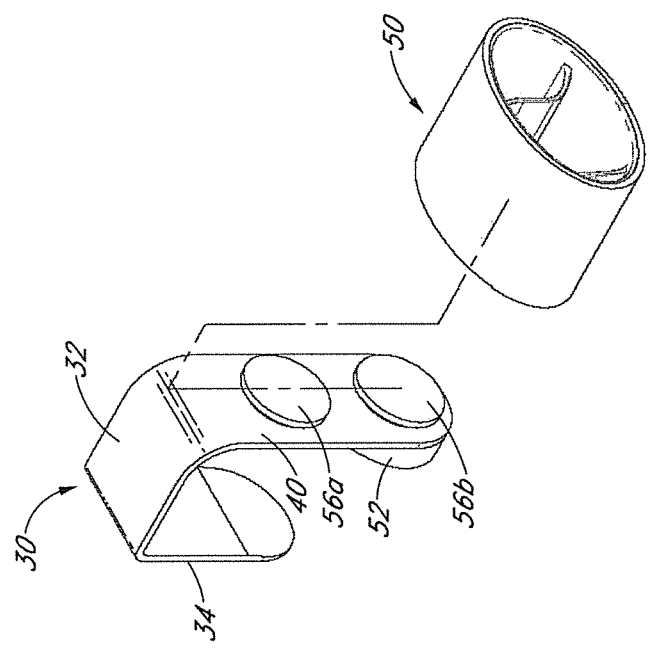
FIG. 9 shows an exploded perspective view of another embodiment of an arm support.

With reference next to FIG. 9, another embodiment is illustrated in which the hanger mount 30 has two spaced apart raised mount members 56a, 56b on its support portion 40. The user may choose which of the raised mounts 56a, 56b to attach the support member 50 based on its position. In the illustrated embodiment, the raised mount members 56a, 56b are spaced vertically from one another. In other embodiments, raised mount members can be horizontally or diagonally spaced from one another as desired. Also in the illustrated embodiment, the raised mount members 56a, 56b are disposed on a part of the support portion 40 that depends from the bridge portion 32. In further embodiments, all or part of the support portion may extend upwardly from the bridge portion. As such, one, two, three, or more raised mount members can be provided and positioned at, above or below the bridge portion. Such a configuration would enable embodiments in which raised mount members can be at, above, or below the top surface of the door panel 24 of the automobile in FIG. 1, or any other structure (such as an airline seat arm rest) to which the hanger mount 30 is attached.

Figure 10:
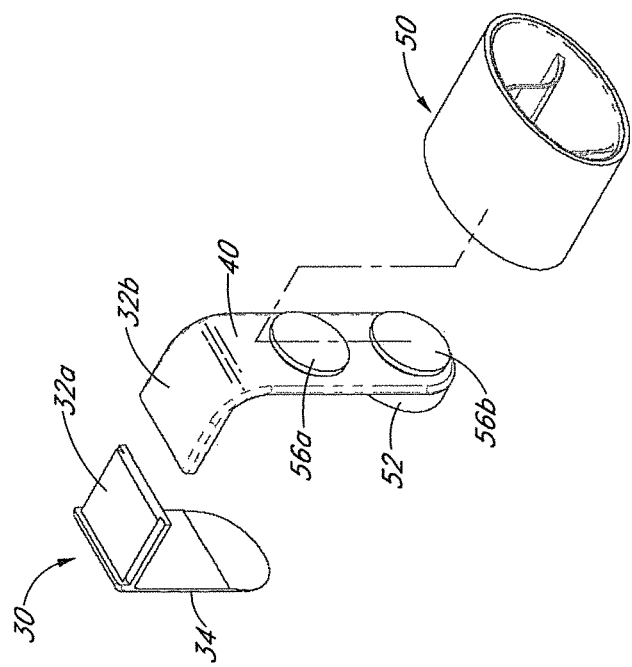
FIG. 10 shows an exploded perspective view of yet another embodiment of an arm support.

With reference next to FIG. 10, another embodiment is illustrated in which the hanger mount 30 comprises multiple pieces that can be assembled together. More specifically, in the illustrated embodiment, the bridge portion of the hanger mount has a telescoping structure in which a first part 32a selectively slides over a second part 32b so that a user can adjust the length of the bridge portion 32 to match the width of, for example, the top surface of the door panel in their particular vehicle.

Figures 11, 12:
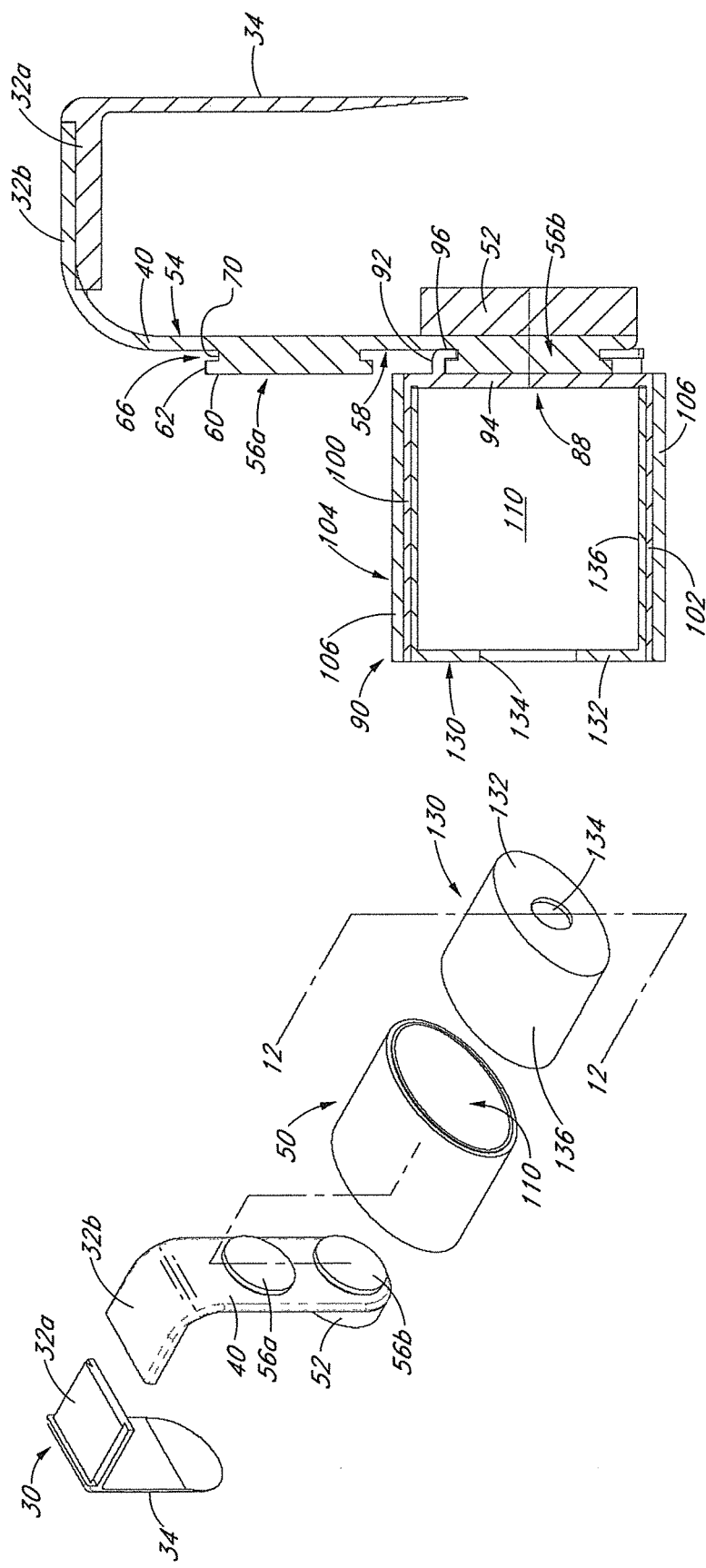
FIG. 11 shows an exploded perspective view of still another embodiment of an arm support.
FIG. 12 is a cross-section taken along lines 12-12 of FIG. 11.

With reference next to FIGS. 11 and 12, another embodiment is illustrated in which the support member 50 is configured to comprise a removable insert 130 within the hollow space 110. In the illustrated embodiment, the insert 130 comprises a front wall 132 having an access hole 134 formed therethrough and an outer wall 136, each of which is shaped generally complementary to the outer support portion 90. As such, the insert 130 fits snugly within the hollow space 110, forming a storage space between the insert front wall 132 and the support member back wall 94. In this embodiment, there is no connector wall extending inwardly from the back wall 94 into the hollow space towards the front edge of the outer support portion, although in some embodiments inserts can be formed to accommodate some form of connector wall that may or may not have structure similar to the connector wall 116 discussed above. Also, in the illustrated embodiment, the back wall 94 extends between and connects to both the upper part 100 and lower part 102 of the support member 50.

In the illustrated embodiment the insert 130 comprises an access hole 134. In other embodiments the insert front wall 132 can be completely closed, and a knob or the like can be provided. Further embodiments may employ key access or the like. In yet further embodiments, the insert 130 may be completely enclosed, having both front and back walls, and may even have its own door rather than being open on one end. Still further embodiments may not employ a removable insert, but instead may have a door removably or hingedly attached to the front edge of the outer support portion to enclose the hollow space.

In the illustrated embodiments, the hanger mount 30 has been specifically configured for use in an automobile door. However, it is to be understood that the specific structure of the hanger mount 30 can be configured for other applications. For example, in one embodiment, the hanger mount can be configured to engage an airline seat arm rest, and the support portion 40 that supports the raised mount member(s) 56 can extend upwardly from the arm rest. In other embodiments, the hanger mount can be configured to be screwed into a surface such as a wall, can hang from a hook, have a member configured to engage an existing hole, and/or be connectable to a window or the like by suction cups, double-sided tape or other means. In further embodiments, a kit can be provided having a plurality of different types of hanger mounts, and one or more support members that can be used with any or a plurality of the hanger mounts.

The embodiments discussed above have disclosed structures with substantial specificity. This has provided a good context for disclosing and discussing inventive subject matter. However, it is to be understood that other embodiments may employ different specific structural shapes and interactions.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A portable arm support, comprising:
    a mount configured to be attachable to a structure, the mount having a raised mount portion extending from a support surface of the mount, the raised mount portion comprising an arcuate portion and a raised stop having first and second stop surfaces; and
    a support member having an upper surface configured to accept a user's arm rested thereupon, the support member having a front side and a back side, a connector being provided on the back side, the connector configured to engage the raised mount portion so that the support member is supported by the raised mount portion;
    wherein the connector engages the raised mount portion so that the support member is rotatable relative to the raised mount portion between a first position in which the connector engages the first stop surface and a second position in which the connector engages the second stop surface;
    wherein the support member comprises an upper part and a lower part, and the connector is attached to the lower part so that a vertical space is disposed between the upper part and the connector; and
    wherein the support member is configured to deflect upon application of a force to the upper part so that the space between the upper part and the connector decreases upon application of the force.

2. A portable arm support as in claim 1, wherein the support member upper surface is curved so as to be upwardly convex.

3. A portable arm support as in claim 2, wherein the upper surface of the support member comprises a non-stick pad.

4. A portable arm support as in claim 1, wherein the raised mount portion comprises a disk-shaped member having a circumferential edge, and a channel is formed between the circumferential edge and the support surface of the mount, wherein the connector comprises a lip that fits into the channel.

5. A portable arm support as in claim 4, wherein a hollow space is defined between the front and back sides of the support member.

6. A portable arm support as in claim 5 additionally comprising an insert sized and configured to releasably fit within the hollow space, the insert comprising a front wall configured to enclose the front side of the support member.

7. A portable arm support as in claim 6, wherein the support member has a back wall at or adjacent the back side, and the connector extends from the back wall.

8. A portable arm support as in claim 4, wherein the mount is configured to engage an inside door panel of an automobile so that the support surface of the mount is generally vertical and rests against the inside door panel.

9. A portable arm support, comprising:
a mount having an upwardly-directed portion;
a support member having an upper part and a lower part, the upper part defining an upper surface configured to accept a user's arm rested thereupon;
a connector attached to the lower part of the support member but spaced from the upper part of the support member;
a spring structure between the upper and lower parts of the support member; and
a mount member defined on the upwardly directed portion of the mount;
wherein the connector selectively engages the mount member of the upwardly directed portion of the mount so that the support member is suspended from and supported by the mount member.

10. A portable arm support as in claim 9, wherein the upwardly-directed portion is vertical.

11. A portable arm support as in claim 9, wherein the upper part of the support member is arcuate, and the spring structure is at least partially incorporated into the upper part.

12. A portable arm support as in claim 11, wherein the spring structure is at least partially incorporated into a transition between the upper and lower parts.

13. A portable arm support as in claim 10, wherein the connector selectively engages the mount member so that the support member is rotatable relative to the mount.

14. A portable arm support as in claim 13, wherein the upwardly-directed portion comprises a plurality of mount members that are vertically and/or horizontally spaced apart from one another.

15. A portable arm support as in claim 9, wherein the upper and lower parts of the support member define a space therewithin.

16. A portable arm support as in claim 15, wherein the support member has a front side and a back side, and the connector selectively engages the mount member at or adjacent the back side.

17. A portable arm support as in claim 16 additionally comprising a connector wall extending from the connector toward the front side of the support member, an elongate portion of the connector wall attached to the lower part of the support member between the second and first sides of the support member.

18. A portable arm support, comprising:
a mount configured to be attachable to a structure, the mount having a raised mount portion extending from a support surface of the mount, the raised mount portion comprising an arcuate portion and a raised stop having first and second stop surfaces; and
a support member having an upper surface configured to accept a user's arm rested thereupon, the support member having a front side and a back side, a connector being provided on the back side, the connector configured to engage the raised mount portion so that the support member is supported by the raised mount portion;
wherein the support member upper surface comprises a non-stick pad and is curved so as to be upwardly convex; and
wherein the connector engages the raised mount portion so that the support member is rotatable relative to the raised mount portion between a first position in which the connector engages the first stop surface and a second position in which the connector engages the second stop surface.

19. A portable arm support as in claim 18, wherein the support member comprises an upper part and a lower part, and the connector is attached to the lower part so that a vertical space is disposed between the upper part and the connector.

20. A portable arm support as in claim 19, wherein the support member is configured to deflect upon application of a force to the upper part so that the space between the upper part and the connector decreases upon application of the force.

* * * * *